No. 773,257. PATENTED OCT. 25, 1904.
S. V. HUBER.
ROLLING MILL TABLE.
APPLICATION FILED JAN. 2, 1904.
NO MODEL. 3 SHEETS—SHEET 1.

WITNESSES:
Herbert Bradley
Fred Kirchner

INVENTOR
Sigmund V. Huber
by Christy & Christy
Att'ys.

No. 773,257. PATENTED OCT. 25, 1904.
S. V. HUBER.
ROLLING MILL TABLE.
APPLICATION FILED JAN. 2, 1904.
NO MODEL. 3 SHEETS—SHEET 2.

WITNESSES:
Herbert Bradley.
Fred Kirchner.

INVENTOR
Sigmund V. Huber
by Christy & Christy
Att'ys.

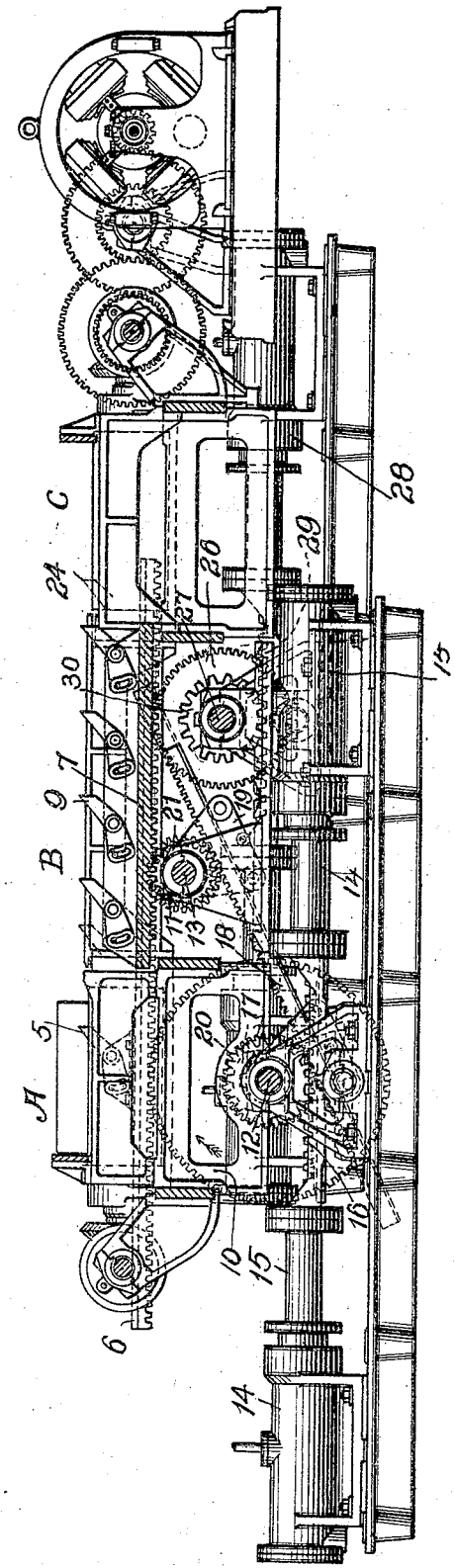

No. 773,257. Patented October 25, 1904.

UNITED STATES PATENT OFFICE.

SIGMUND V. HUBER, OF PITTSBURG, PENNSYLVANIA.

ROLLING-MILL TABLE.

SPECIFICATION forming part of Letters Patent No. 773,257, dated October 25, 1904.

Application filed January 2, 1904. Serial No. 187,528. (No model.)

*To all whom it may concern:*

Be it known that I, SIGMUND V. HUBER, a citizen of the United States, residing at Pittsburg, in the county of Allegheny and State of Pennsylvania, have invented or discovered certain new and useful Improvements in Rolling-Mill Tables, of which improvements the following is a specification.

The invention described herein relates to certain improvements in feed apparatus for rolling-mills, and has for its object a construction and combination of parts or elements whereby an article fed onto the receiving-table of a rolling-mill can be transferred laterally onto a storage or cooling table, moved step by step across such table, transferred laterally to the feed-table of a shear or other mechanism, and fed longitudinally to such shear or other mechanism. The invention is hereinafter more fully described and claimed.

Figure 1:
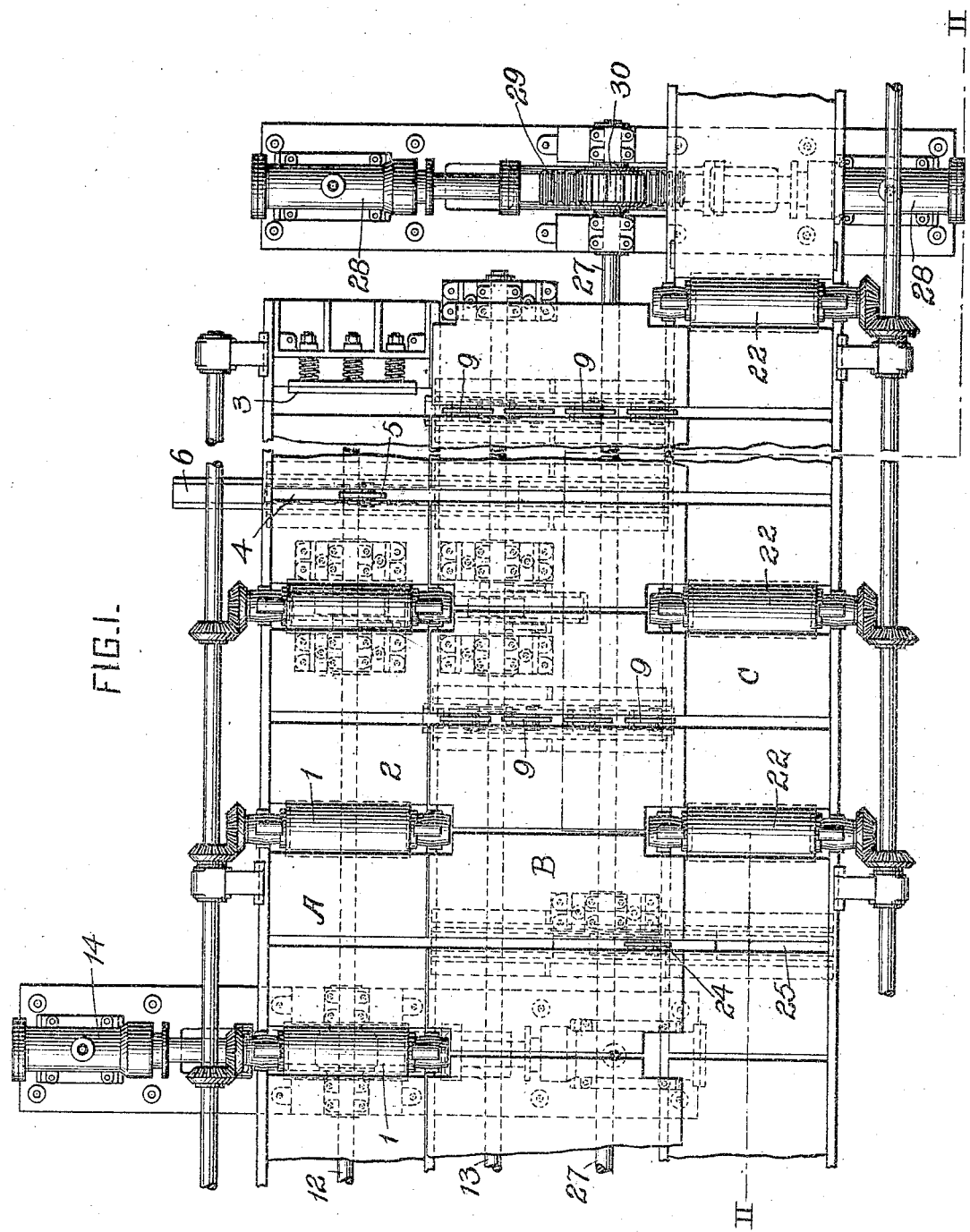
Figure 2:
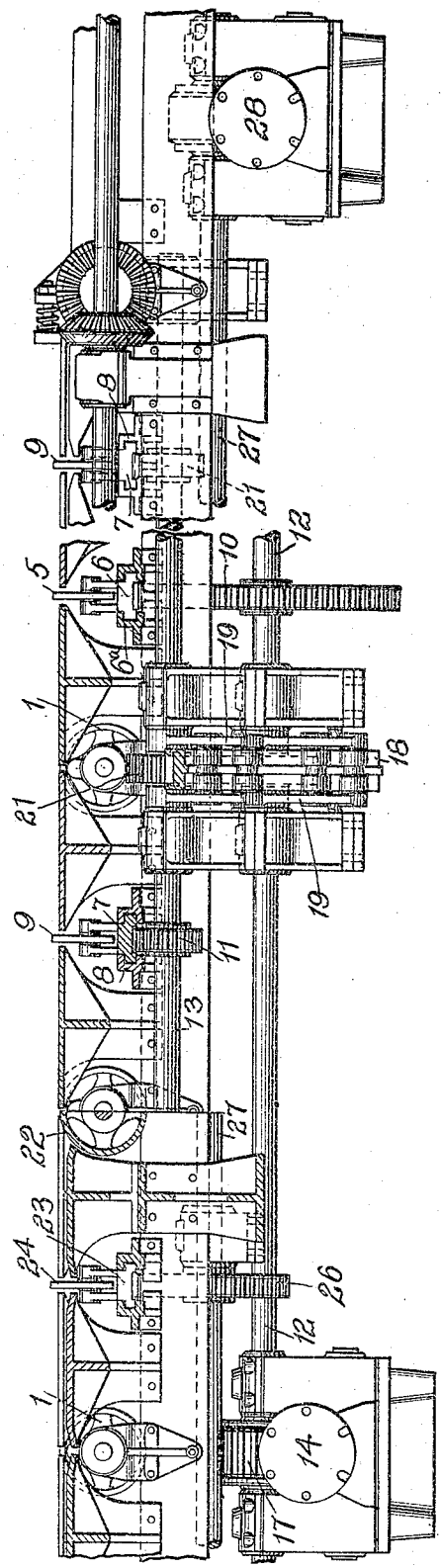

In the accompanying drawings, forming a part of this specification, Figure 1 is a top plan view of a portion of a feed apparatus embodying my improvement. Fig. 2 is a sectional elevation of the same, the plane of section being indicated by the line II II, Fig. 1; and Fig. 3 is a sectional elevation on a plane indicated by the line III III, Fig. 1.

In the practice of my invention the receiving-table, consisting of the positively-driven feed-rollers 1 and supporting-aprons 2, is arranged in the line of feed of the rolls of a reducing-mill. This table is provided with a suitable stop 3 to prevent the longitudinal movement of the article—*e. g.*, bars or plates—off the table. The aprons 2 are transversely slotted, as at 4, for the back-and-forth movement of a series of shifting dogs 5, which are pivotally mounted on bars 6, arranged to reciprocate in suitable guideways 6ª. The dogs 5 are so constructed and arranged, as by weighting their rear ends, that the opposite ends will be normally held projecting above the aprons, but will be free to be forced down by a bar or plate during the backward movement of the slides 6. While only one of the slides 6, with its dog, is shown, it will be understood that in practice a number of such slides and dogs are employed, the number being dependent on the length of the table A.

The slides 6, with their dogs, will shift a bar or plate laterally from the table A onto the storage or cooling table B, which is arranged alongside of the table A. The movement of the bars or plates across table B is effected by a series of slides 7, mounted in suitable guides 8 and each provided with a series of dogs 9, similar in construction and operation to the dogs 5. The number of slides 7 employed will depend upon the length of the table, and the number of dogs on each slide will be controlled by the width of the table and the number of plates or bars to be stored thereon at one time. The range of movement of the slides 6 and 7 is such that the dogs on slides 6 will push the bar or plate to such position that it can be caught by the first dogs of the series on the slides 7.

Provision is made to shift both series of slides 6 and 7 simultaneously and to impart a greater movement to the slides 6 than to the slides 7, for the reason that the dogs on slides 6 must be capable of catching a plate or bar on any part of the table A and shift it entirely off the table A, while it is only necessary that the dogs on slides 7 should advance the plate or bar at each stroke a distance a little greater than the width of the article.

The slides 6 and 7 are toothed on their under sides for engagement with toothed wheels 10 and 11, secured, respectively, on shafts 12 and 13, extending longitudinally under the tables A and B. One of these shafts, as 12, rotates back and forth by any suitable means—as, for example, by fluid-pressure cylinders 14, having their common piston-rod 15 secured to a rack-bar 16, which intermeshes with a toothed wheel 17 on the shaft 12. By properly proportioning the stroke of the piston-rod and the diameters of the wheels 17 and 10 the desired movement can be given to the slides 6. It will be understood that the shaft 13 can be driven from the shaft 12 by the employment of a train of gearing; but as the shafts 12 and 13 are located some distance apart a number of gear-wheels would be required. In order to avoid such multiplicity of gear-wheels, a rack-bar 18 is employed. This rack-bar is mounted in suitable guideways 19 and intermeshes with toothed wheels 20 and 21 on the shafts 12 and 13, respectively. By properly proportioning the toothed wheels 20, 21, and 11 the desired movement of the slides 7 can be had from the shaft 12.

In order to shift the articles from table B to table C, which is provided with positively-driven feed-rollers 22, arranged transversely of the table, reciprocating slides 23 are employed. These slides are provided with dogs 24, constructed and arranged in the same manner as the dogs 5 and 9. The front ends of these dogs project normally through transverse slots 25 in the table C, and the slides 23 are given such a movement that the dogs will engage an article in the position to which it was shifted by the last of the series of dogs 9 and shift it to any desired position on the table C. The slides 23 are provided with teeth which intermesh with a pinion 26 on shaft 27. This shaft is rotated back and forth by fluid-pressure cylinders 28, having a rack-bar 29 connected to the common piston-rod and engaging a pinion 30 on the shaft 27.

I claim herein as my invention—

1. An apparatus for rolling-mills having in combination a receiving-table, reciprocating dogs for shifting the article across the receiving-table, a storage-table, two or more slides, each provided with a series of two or more dogs and mechanism for reciprocating the several dogs whereby an article is shifted from the receiving to the storage table and moves step by step across the latter, substantially as set forth.

2. An apparatus for rolling-mills having in combination a receiving-table, reciprocating dogs for shifting the article across the receiving-table, a storage-table, two or more slides movable transversely of said table, each slide provided with a series of two or more dogs, and means for simultaneously reciprocating the dogs of the receiving and storage tables different distances, substantially as set forth.

In testimony whereof I have hereunto set my hand.

SIGMUND V. HUBER.

Witnesses:
DARWIN S. WOLCOTT,
F. E. GAITHER.